United States Patent
Cazenave et al.

(10) Patent No.: US 6,948,498 B2
(45) Date of Patent: Sep. 27, 2005

(54) PROCESS AND INSTALLATION FOR THE DISTRIBUTION OF AIR ENRICHED IN OXYGEN TO PASSENGERS OF AN AIRCRAFT

(75) Inventors: Jean-Michel Cazenave, Grenoble (FR); Jean Dehayes, Lumbin (FR); Olivier Vandroux, Grenoble (FR); Richard Zapata, Sassenage (FR)

(73) Assignee: L'Air Liquide-Societe Anonyme a Diretoire et Conseil de Surveillance pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 10/701,528

(22) Filed: Nov. 6, 2003

(65) Prior Publication Data

US 2004/0099271 A1 May 27, 2004

Related U.S. Application Data

(62) Division of application No. 10/068,869, filed on Feb. 11, 2002, now Pat. No. 6,701,923.

(30) Foreign Application Priority Data

Apr. 4, 2001 (FR) .............................................. 01 04569

(51) Int. Cl.[7] .............................................. A61M 16/00
(52) U.S. Cl. ............................. 128/204.22; 128/204.29; 128/205.11
(58) Field of Search ....................... 128/204.22, 204.29, 128/205.11, 206.27

(56) References Cited

U.S. PATENT DOCUMENTS

| | | | |
|---|---|---|---|
| 2,931,355 A | * | 4/1960 | Miller et al. ........... 128/204.29 |
| 2,934,293 A | * | 4/1960 | Boehme et al. .......... 244/118.5 |
| 3,045,691 A | | 7/1962 | Herbert |
| 3,073,301 A | * | 1/1963 | Hay et al. .............. 128/205.24 |
| 3,456,642 A | | 7/1969 | Cupp |
| 3,503,394 A | * | 3/1970 | Hotz et al. ............. 128/206.27 |
| 3,675,649 A | | 7/1972 | Basham et al. |
| 3,981,302 A | * | 9/1976 | Veit ....................... 128/202.26 |
| 4,109,509 A | * | 8/1978 | Cramer et al. .............. 73/23.3 |
| 4,154,237 A | * | 5/1979 | Courter ................. 128/206.27 |
| 4,198,213 A | | 4/1980 | Mannatt |
| 4,428,372 A | * | 1/1984 | Beysel et al. .......... 128/202.26 |
| 4,454,878 A | * | 6/1984 | Morrison ............... 128/201.27 |
| 4,481,945 A | * | 11/1984 | Levine ................... 128/206.27 |
| 4,561,287 A | * | 12/1985 | Rowland ....................... 95/11 |
| 4,602,653 A | * | 7/1986 | Ruiz-Vela et al. ............ 137/88 |
| 4,627,860 A | * | 12/1986 | Rowland ...................... 96/111 |
| 4,651,728 A | * | 3/1987 | Gupta et al. ........... 128/201.28 |
| 4,681,602 A | | 7/1987 | Glenn et al. |
| 4,710,756 A | * | 12/1987 | Thornburg et al. ......... 340/628 |
| 4,840,171 A | * | 6/1989 | Rohling et al. ........ 128/204.18 |
| 4,909,247 A | * | 3/1990 | Terrisse et al. ........ 128/206.27 |

(Continued)

FOREIGN PATENT DOCUMENTS

| | | |
|---|---|---|
| EP | 0 129 304 | 12/1984 |
| EP | 0 827 907 | 3/1998 |
| FR | 2 768 633 | 3/1999 |
| WO | 02/04076 | 1/2002 |

*Primary Examiner*—Aaron J. Lewis
(74) *Attorney, Agent, or Firm*—Young & Thompson

(57) ABSTRACT

According to this process, there is supplied to the passengers a first fraction of air enriched in oxygen from independent supply elements, in particular high pressure cylinders (16), during a descent phase of the aircraft between a normal cruising altitude and an intermediate re-routing altitude. There is moreover compressed air taken from a source of compressed air belonging to the aircraft, to produce (in 2) a second fraction of the air enriched in oxygen which is delivered to the passengers, at least during a phase of stabilized flight of the aircraft, adjacent the re-routing altitude, greater than 5,500 meters.

15 Claims, 1 Drawing Sheet

U.S. PATENT DOCUMENTS

| | | | | |
|---|---|---|---|---|
| 4,960,119 A | * | 10/1990 | Hamlin | 128/204.18 |
| 5,169,415 A | | 12/1992 | Roettger et al. | |
| 5,199,423 A | | 4/1993 | Harral et al. | |
| 5,460,175 A | | 10/1995 | Foote et al. | |
| 5,531,220 A | | 7/1996 | Cassidy | |
| 5,642,729 A | | 7/1997 | Cassidy | |
| 5,803,062 A | * | 9/1998 | Aulgur | 128/202.26 |
| 5,809,999 A | | 9/1998 | Lang | |
| 5,816,244 A | * | 10/1998 | Aulgur | 128/206.27 |
| 5,848,591 A | * | 12/1998 | Weismann | 128/204.22 |
| 5,988,161 A | | 11/1999 | Kroll | |
| 5,988,165 A | | 11/1999 | Richey et al. | |
| 6,651,658 B1 | * | 11/2003 | Hill et al. | 128/204.23 |
| 6,688,308 B1 | * | 2/2004 | Phillips et al. | 128/204.22 |
| 6,701,923 B2 | * | 3/2004 | Cazenave et al. | 128/204.22 |

* cited by examiner

PROCESS AND INSTALLATION FOR THE DISTRIBUTION OF AIR ENRICHED IN OXYGEN TO PASSENGERS OF AN AIRCRAFT

CROSS REFERENCE TO RELATED APPLICATIONS

This application is a division of Application Ser. No. 10/068,869, filed on Feb. 11, 2002, now U.S. Pat. No. 6,701,923, the entire contents of which are hereby incorporated by reference

BACKGROUND OF THE INVENTION

The present invention relates to a process and an installation for the distribution of air enriched in oxygen to the passengers of an aircraft, more particularly a commercial airliner.

During accidental depressurization of the cabin of an airplane, at high altitude, the occupants (passengers and crew) must rapidly inhale air enriched in oxygen, so as to avoid a condition of hypoxia, due to the abrupt decrease in the partial pressure of oxygen.

To this end, it is known to provide independent means, permitting supplying air enriched in oxygen. It can be high pressure cylinders, in which is stored pure oxygen. Alternatively, it can be produced by means of chemical oxygen generators.

The distribution of oxygen to the passengers, from supply means, takes place by means of masks. These latter permit a mixture of distributed oxygen and ambient air. Distribution is stopped when the aircraft regains a low altitude of about 3,000 meters, which is reached about 15 minutes from a beginning altitude of about 12,500 meters.

This known solution however has certain drawbacks.

In particular, given that, in the case of depressurization, the aircraft must necessarily regain a relatively low altitude, about 3,000 meters, it is indispensable to retain in the fuel tanks a supplemental fuel quantity. Thus, the consumption of the aircraft is increased at this low altitude, because of the greater air resistance. It will be easily be seen that the carrying of this supplemental fuel contributes to increasing the weight of the apparatus significantly.

The invention proposes to use a process for the distribution of air enriched in oxygen, permitting overcoming this drawback.

SUMMARY OF THE INVENTION

To this end, it has for an object a process for the distribution of air enriched in oxygen to passengers of an aircraft, in which there is supplied to the passengers a first fraction of air enriched in oxygen from an independent source, during a descent phase of the aircraft between a cruising altitude and a re-routing altitude, and there is produced, in an onboard separator, a second air fraction enriched in oxygen, which is delivered to the passengers, at least during a substantially stabilized phase of the flight of the aircraft, taking place at about the re-routing altitude.

The invention permits achieving the objects mentioned above.

Thus, according to the invention, the onboard separator can produce air enriched in oxygen, from a source of compressed air belonging to the aircraft, for a very great period of time. The passengers are thus able to be supplied with air enriched in oxygen, not only during the time of descent, but also during the re-routing flight itself.

It will thus be easily seen that the altitude of re-routing can, because of this fact, be substantially greater than that of the prior art. Thanks to the process of the invention, it is thus possible to be able to re-route at altitudes greater than 5,500 meters, preferably comprised between 6,000 and 8,000 meters, permitting avoiding most of the high mountains on earth. By way of comparison, with the process using the solution of the prior art, such a re-routing altitude would require supply means, such as cylinders or generators, whose size and mass would be unacceptable.

Moreover, the quantity of reserve fuel, which must be kept in tanks of the aircraft, is substantially reduced thanks to the invention. Thus, the re-routing altitude permitted by the invention gives rise to a substantial decrease in the consumption of fuel relative to the prior art, which requires achieving a much lower altitude. The reduction of this supplemental quantity of fuel thus ensures a corresponding decrease in the weight of the aircraft, as well as its consumption. Moreover, this reduction of volume of onboard fuel permits the carrying of additional occupants or baggage, which is economically advantageous.

Given that the invention permits higher rerouting altitudes, it permits, as mentioned above, airline companies to design new routes, overflying mountainous regions. Such a possibility of advantageous to the extent to which it is able to reduce the duration of the flights. It should be remembered that the routes referred to above are up to the present forbidden, when they fly above regions whose altitude is greater than the re-routing altitude permitted by the prior art.

Finally, the invention permits avoiding the transportation of heavy gaseous oxygen cylinders or overdimensioned onboard oxygen generators. This guarantees a decrease in weight of the apparatus, and considerably reduces the risks of explosion during onboard fires.

The invention also has for its object an installation for supplying air enriched in oxygen to the passengers of an aircraft, comprising an independent source of a first fraction of air enriched in oxygen, onboard means for the production of a second fraction of air enriched in oxygen, means to deliver the first and second fractions of air enriched in oxygen to the passengers, and means (14) for sequential distribution of the respective flows of the first and second fractions of air enriched in oxygen to the delivering means (20, 22, 23).

BRIEF DESCRIPTION OF THE DRAWING

The invention will now be described below, with reference to the accompanying single FIGURE, given solely by way of nonlimiting example, this FIGURE being a schematic view showing one embodiment of an installation for the distribution of air enriched in oxygen according to the invention.

DETAILED DESCRIPTION OF THE PREFERRED EMBODIMENTS

Figure 1:
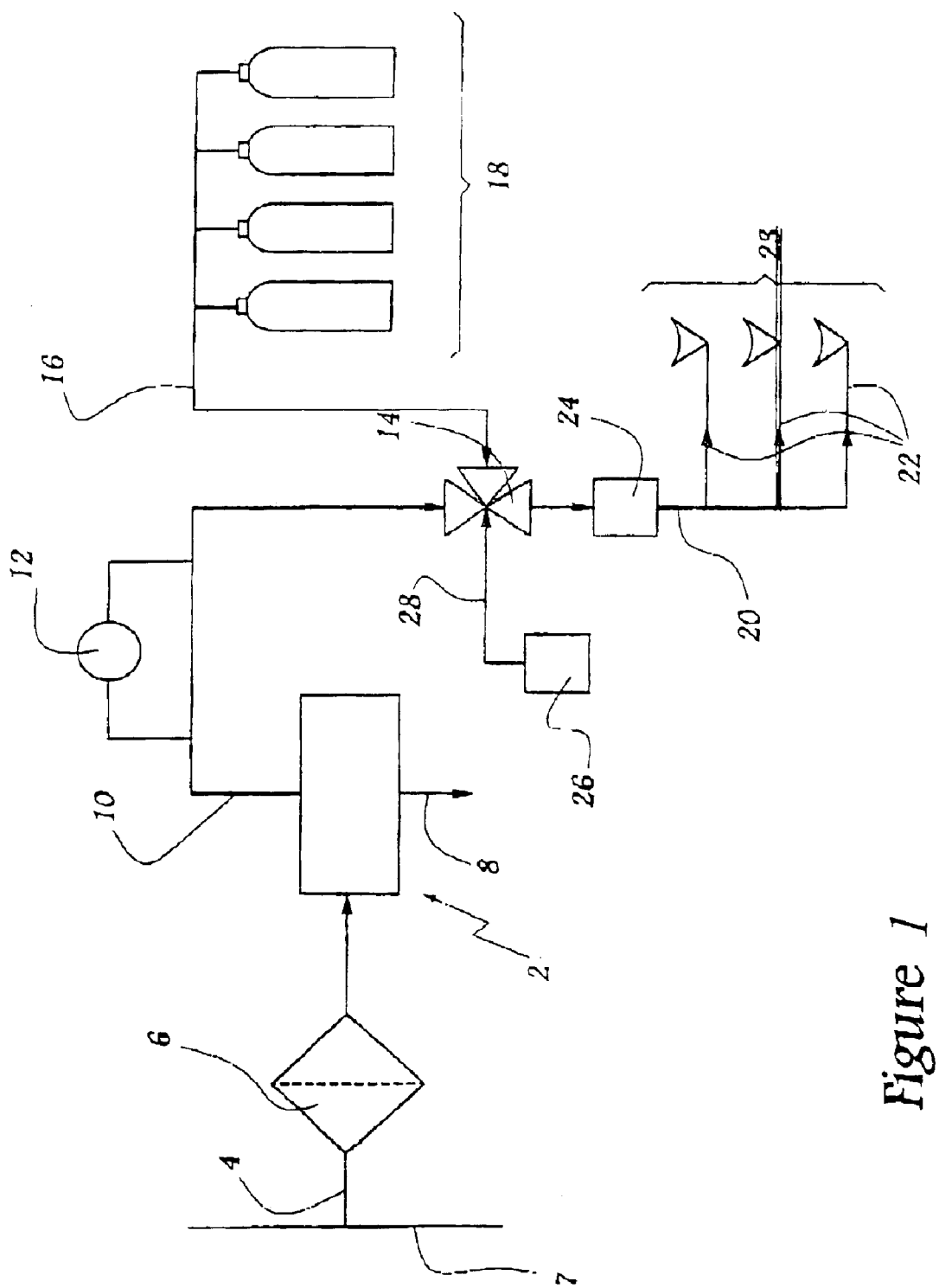

The distillation installation shown in this FIGURE comprises a separator or concentrator of oxygen of known type, designated overall by the reference numeral 2. This concentrator, which permits a separation of the oxygen and the nitrogen contained in the air typically using molecular sieves, particularly zeolites, of a type known per se. This concentrator supplies at its outlet, air enriched in oxygen with an oxygen content preferably between 60 and 95%, typically between 80 and 93%, at a low pressure typically comprised between 1.5 and 2.5 bars gauge.

This concentrator 2 is connected by a line 4 provided with a filter 6, with a source 7 of compressed air within an airplane. Such a source is for example comprised by the air conditioning circuit of the aircraft, or else by removal from the compressor stage of the reactors.

The concentrator 2 comprises an outlet conduit 8, within which circulates air enriched in nitrogen, as well as a line 10, within which circulates the air enriched in oxygen. This line 10 is provided with a detector 12, permitting monitoring the oxygen content of the enriched air which circulates in it.

In the illustrated embodiment, the line 10 opens into a three-way valve 14, that communicates moreover via a conduit 16 with a battery of gas cylinders 18. These latter ensure, in a conventional way, the storage of pure oxygen under high pressure greater than 110 bars gauge, typically between 120 and 150 bars. They can be complemented, as the case may be, by chemical oxygen generators (not shown) which are also of known type. A conduit 16 comprises at least one regulator/expander (not shown) to supply to the line 20 oxygen under a reduced pressure, below 3 bars gauge.

The outlet of the three-way valve 14 is constituted by a distribution line 20, running along the airplane cabin and which is divided into several branches 22 of which each is adapted to supply an oxygen mask 23 for one passenger. This line 20 is provided with a pressure regulator 24, which permits evenly distributing the quantity of air distributed to the assembly of the branches 22.

Finally, there is provided an altimeter 26, coacting with actuation means (not shown), permitting controlling the valve 14, via the line 28. As a modification, this altimeter could be replaced or supplemented by a pressure detector.

The operation of the installation described above will be explained in the following.

At cruising altitude, for example about 12,500 meters, the line 20 is not supplied, neither by the concentrator 2, which is on standby, nor by the cylinders 18.

During a depressurizing accident, a signal is sent conventionally to the pilot. This latter thus initiates the immediate opening of the cylinders 18, so as to supply the line 20 with enriched air, from the conduit 16 and via the three-way valve 14. This guarantees the immediate distribution to the passengers of a first fraction of air enriched in oxygen, by means of branches 22, terminating in oxygen masks 23.

Moreover, the pilot simultaneously starts the oxygen concentrator 2, which requires a startup time of several minutes. Given that, during this startup, the three-way valve is in communication solely with the conduit 16, and not with the line 10, it is necessary to provide an outlet for evacuation of the air produced initially by the concentrator. Such an evacuation (not shown in the drawing) can be located in the three-way valve 14, or else upstream of the latter in the supply line 10.

When the predetermined rerouting altitude is reached, typically above 5,000 meters, preferably between 6,000 to 8,000 meters, the altimeter 26 causes the swinging of the three-way valve 14, which then places in communication the line 20 with the concentrator 2, via the line 10. In this way, the masks receive, via the supply line 20 and its branch 22, a second fraction of air enriched in oxygen, supplied by the concentrator 2.

The second fraction of air has a high oxygen content, between 60 and 95%, preferably between 80 and 93%. This air enriched in oxygen is diluted with ambient air at the mask 23, during inhaling by the occupant, to reconstitute the oxygen content suitable to the altitude of the rerouted flight (between 26% for an altitude of 5,500 meters and 40% for an altitude of 8,000 meters), which avoids having to supply large flow rates at the outlet of the concentrator.

Once these oxygen masks 23 are supplied by the concentrator, the flight is adapted to continue at the preselected rerouting altitude for a period of time limited only by the kerosene supply of the airplane.

What is claimed is:

1. A process for the distribution of air enriched in oxygen to people on an aircraft during abnormal operation of the aircraft, comprising the steps of:
    providing each of the people with an oxygen mask, only when the aircraft is experiencing abnormal operating conditions;
    then, supplying a first fraction of air enriched in oxygen from an independent source to the people through said oxygen mask, during a phase of descent of the aircraft between a cruising altitude and a lower re-routing altitude;
    producing a second fraction of air enriched in oxygen, in an onboard separator different from said independent source; and
    supplying said second fraction of air to the passengers through said oxygen mask, when the aircraft is at said re-routing altitude,
    wherein a supply of the first fraction of air enriched in oxygen is stopped when the aircraft reaches the re-routing altitude.

2. The process according to claim 1, wherein the re-routing altitude is greater than 5,500 meters.

3. The process according to claim 1, wherein the second fraction of enriched air has an oxygen content comprised between 60 and 95% and is produced at a pressure between 1.5 and 2.5 bars gauge.

4. The process according to claim 1, wherein the independent source are cylinder containing oxygen at a pressure higher than 110 bars gauge.

5. The process according to claim 4, wherein the onboard separator obtains compressed air from a source within the aircraft.

6. The process according to claim 5, wherein said source is elected from one of an air conditioning circuit of the aircraft and a compressor stage of reactors of the aircraft.

7. The process according to claim 5, wherein said second fraction of air is produced at a pressure between 1.5 and 2.5 bars gauge.

8. The process according to claim 1, wherein, during said phase of descent, only the first fraction of enriched air is supplied and when the aircraft is at said re-routing altitude, only the second fraction of enriched air is supplied.

9. A process for the distribution of air enriched in oxygen to people on an aircraft during abnormal operation of the aircraft, comprising the steps of:
    providing each of the people with an oxygen mask, only when the aircraft is experiencing abnormal operating conditions;
    then, supplying a first fraction of air enriched in oxygen from an independent source to the people through said oxygen mask, during a phase of descent of the aircraft between a cruising altitude and a lower re-routing altitude;
    producing a second fraction of air enriched in oxygen, in an onboard separator different from said independent source; and
    supplying said second fraction of air to the passengers through said oxygen mask, when the aircraft is at said re-routing altitude, wherein, during said phase of descent, only the first fraction of enriched air is supplied and when the aircraft is at said re-routing altitude, only the second fraction of enriched air is supplied.

10. The process according to claim 9, wherein the re-routing altitude is greater than 5,500 meters.

11. The process according to claim 9, wherein the second fraction of enriched air has an oxygen content comprised between 60 and 95% and is produced at a pressure between 1.5 and 2.5 bars gauge.

12. The process according to claim 9, wherein the independent source are cylinder containing oxygen at a pressure higher than 110 bars gauge.

13. The process according to claim 12, wherein the onboard separator obtains compressed air from a source within the aircraft.

14. The process according to claim 13, wherein said source is elected from one of an air conditioning circuit of the aircraft and a compressor stage of reactors of the aircraft.

15. The process according to claim 13, wherein said second fraction of air is produced at a pressure between 1.5 and 2.5 bars gauge.

* * * * *